UNITED STATES PATENT OFFICE.

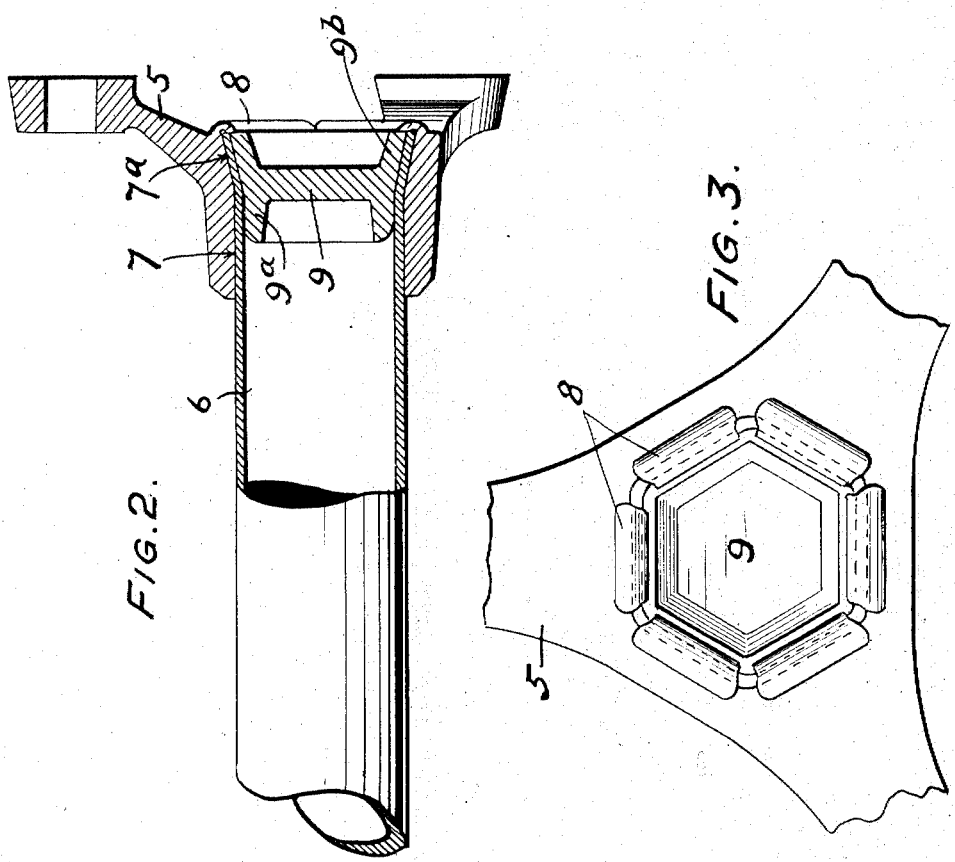

HARRY P. MACDONALD, OF MONTCLAIR, NEW JERSEY, AND WILLIAM S. THOMSON, OF PLANTSVILLE, CONNECTICUT, ASSIGNORS TO THE SNEAD & CO. IRON WORKS, OF JERSEY CITY, NEW JERSEY, A CORPORATION OF NEW JERSEY.

ART OF JOINING METAL PARTS.

1,388,657.   Specification of Letters Patent.   Patented Aug. 23, 1921.

Application filed April 4, 1919. Serial No. 287,570.

*To all whom it may concern:*

Be it known that we, HARRY P. MACDONALD and WILLIAM S. THOMSON, citizens of the United States, respectively, residing at Montclair, county of Essex, and State of New Jersey, and Plantsville, county of Hartford, and State of Connecticut, have invented certain new and useful Improvements in the Art of Joining Metal Parts, of which the following is a specification.

This invention relates to the art of joining metal parts and is in the nature of an improvement on the invention shown and described in co-pending application of Harry P. Macdonald filed January 30, 1919, Serial No. 273,974.

The invention is of particular value in joining tubes to other metallic parts of automotive propeller assemblies. One of the primary objects of our invention is the provision of a simple and inexpensive joint provided with improved means for preventing relative shifting of the parts.

The foregoing together with such other objects as may hereinafter appear, are accomplished by means of a process and apparatus illustrated in preferred form in the accompanying drawings, wherein—

Figure 1 is a section through a piece of steel tubing joined to a metal part such for example as a three arm spider, constituting a part of a coupling; Fig. 2 is a side elevation and partial section of Fig. 1; Fig. 3 is an end elevation of Fig. 2; and Fig. 4 is a sectional view showing the disposition of the parts in an intermediate stage of manufacture.

In carrying out our invention we provide the spider 5, or other part to which the tubing 6 is to be joined, with a central aperture or hole 7. That portion of the aperture at the inner end of the spider is preferably machined and has a diameter which is slightly smaller than the outside diameter of the tube at its front end. That portion of the aperture at the outer end of the spider 5, indicated by the reference numeral 7ª, is enlarged, being preferably given a hexagonal or other irregular shape as indicated in Figs. 1 and 3. The spider 5 is provided with outstanding lips or lugs 8 adjacent the enlarged portion 7ª of the aperture.

In carrying out our process the spider 5 is heated so as to cause it to expand sufficiently to permit of its being slipped over the end of the tube, the spider shrinking fast on to the tube when it has cooled. Before the cooling has been completed the outer end of the tube is heated, as for example by means of an acetylene torch or other device, and a wedge 9 is forced into the tube, thereby expanding the tube and forcing it tightly into the enlarged portion 7ª of the aperture. The wedge 9 is preferably provided with a cylindrical portion 9ª having a diameter closely approximating the inside diameter of the tube and an enlarged portion 9ᵇ which is given a shape corresponding to that of the enlarged portion 7ª of the aperture.

The inner edges of the wedge 9 are rounded to facilitate insertion and the juncture between the cylindrical portion and the enlarged portion of the central opening in the spider 5 are eased off so as to not leave any abrupt corners which would cause too much local distortion in the tube when expanded into place.

The wedge 9 may be left in place or withdrawn. In either case the lips or lugs 8 are folded or bent down over the end of the tube and over the end of the wedge, if the wedge be allowed to remain, thus assisting in holding the parts in position and preventing longitudinal shifting of the tube and spider relative to each other. The expansion of the tube into the irregular shaped opening 7ª noted above not only prevents relative rotation of the parts, as in a certain measure does the shrinkage bond between the cylindrical portion of the spider and the tube, but also prevents longitudinal shifting of the spider with reference to the tube in one direction. The bent over lugs prevent longitudinal shifting in the opposite direction. It will be obvious that the enlarged portion 7ª may be of any shape capable of producing the desired results and also that equivalent means may be substituted for the lips 8.

The joint is a simple and inexpensive one and has great strength and rigidity. The invention is also advantageous in that the lips 8 form a substitute for welding the end of the tube to the spider, so that any possible injury to the metal resulting from the welding temperatures may be avoided.

We claim:

1. As a new article of manufacture, a torque transmitting device comprising a tubular member, a spider member adapted to connect said tubular member to an adjacent part, said spider having a hub to receive an end of the tubular member, the opening in the hub being enlarged to a non-circular section of greater diameter than the tubular member, a wedge for expanding the tube in such enlarged portion, and lug means on the spider member overlying the end of the tubular member and the wedge.

2. As a new article of manufacture, a tubular member, a sleeve-like member adapted to connect said tubular member to an adjacent part, the opening in said sleeve-like member being enlarged to a non-circular section of greater diameter than the tubular member, the end of the tube being enlarged to fit said enlarged opening, and lug means on the sleeve-like member overlying the end of the tubular member.

3. As a new article of manufacture, a round tube, a sleeve-like member adapted to receive an end of said tube and tightly fitting the same, said end of the tube being enlarged to a non-circular section and the opening in the sleeve being similarly enlarged, and a portion of said sleeve-like member being deformed over the end of the tube.

In testimony whereof, we have hereunto signed our names.

HARRY P. MACDONALD.
WILLIAM S. THOMSON.